US009180370B2

(12) United States Patent
Alexander et al.

(10) Patent No.: US 9,180,370 B2
(45) Date of Patent: Nov. 10, 2015

(54) METHODS AND APPARATUS FOR ACOUSTIC MODEL BASED SOUNDTRACKS

(75) Inventors: Jeffrey L. Alexander, Arlington, MA (US); Paul B. Lamere, Nashua, NH (US); Seth T. Proctor, Concord, MA (US)

(73) Assignee: Oracle America, Inc., Redwood City, CA (US)

( * ) Notice: Subject to any disclaimer, the term of this patent is extended or adjusted under 35 U.S.C. 154(b) by 2165 days.

(21) Appl. No.: 11/644,651

(22) Filed: Dec. 22, 2006

(65) Prior Publication Data

US 2008/0154403 A1    Jun. 26, 2008

(51) Int. Cl.
*G06F 17/00* (2006.01)
*A63F 13/40* (2014.01)

(52) U.S. Cl.
CPC ......... *A63F 13/10* (2013.01); *A63F 2300/6018* (2013.01); *A63F 2300/6063* (2013.01); *A63F 2300/8047* (2013.01)

(58) Field of Classification Search
CPC ............ A63F 13/10; A63F 2300/6018; A63F 2300/6063; A63F 2300/8047

USPC ........................................................... 700/94
See application file for complete search history.

(56) References Cited

U.S. PATENT DOCUMENTS

| 6,347,998 | B1 * | 2/2002 | Yoshitomi et al. ............... 463/42 |
| 6,991,542 | B2 * | 1/2006 | Asami et al. ..................... 463/35 |
| 6,991,543 | B2 * | 1/2006 | Joshi ................................ 463/35 |
| 2006/0212147 | A1 * | 9/2006 | McGrath et al. ................ 700/94 |
| 2007/0105588 | A1 * | 5/2007 | Issa ............................. 455/556.1 |
| 2009/0286560 | A1 * | 11/2009 | Willis ........................... 455/466 |

* cited by examiner

*Primary Examiner* — Paul McCord
(74) *Attorney, Agent, or Firm* — Brooks Kushman P.C.

(57) ABSTRACT

A system provides a model for use within a digital environment. The model comprises at least one music segment, and supplies music for the digital environment. The system identifies a location within the digital environment. The location requires at least one music segment supplied by the model. The system selects at least one music segment to play within the digital environment. The music segment is selected based on the model, the location requiring the at least one music segment, and the digital environment. The selecting of the music segment is operable to be modified based on the model, the location requiring the at least one music segment, and the digital environment.

9 Claims, 8 Drawing Sheets

203 PROVIDE A MODEL FOR USE WITHIN THE DIGITAL ENVIRONMENT, THE MODEL COMPRISING AT LEAST ONE MUSIC SEGMENT, THE MODEL SUPPLYING MUSIC FOR THE DIGITAL ENVIRONMENT

204 RECEIVE AT LEAST ONE EXAMPLE MUSIC SEGMENT

205 IDENTIFY AT LEAST ONE ATTRIBUTE ASSOCIATED WITH THE AT LEAST ONE EXAMPLE MUSIC SEGMENT, THE AT LEAST ONE ATTRIBUTE INDICATIVE OF A CHARACTERISTIC IDENTIFYING THE MODEL

206 COMPARE THE AT LEAST ONE EXAMPLE MUSIC SEGMENT TO A PLURALITY OF MUSIC SEGMENTS, INCLUDING THE AT LEAST ONE MUSIC SEGMENT, TO IDENTIFY A SIMILARITY BETWEEN THE AT LEAST ONE EXAMPLE MUSIC SEGMENT AND THE AT LEAST ONE MUSIC SEGMENT

207 ASSOCIATE THE AT LEAST ONE MUSIC SEGMENT WITH THE MODEL

214 SELECT THE AT LEAST ONE MUSIC SEGMENT TO PLAY WITHIN THE DIGITAL ENVIRONMENT, THE AT LEAST ONE MUSIC SEGMENT SELECTED BASED ON THE MODEL, THE LOCATION REQUIRING THE AT LEAST ONE MUSIC SEGMENT, AND THE DIGITAL ENVIRONMENT, SELECTING THE AT LEAST ONE MUSIC SEGMENT OPERABLE TO BE MODIFIED BASED ON THE MODEL, THE LOCATION REQUIRING THE AT LEAST ONE MUSIC SEGMENT, AND THE DIGITAL ENVIRONMENT

215 PROVIDE AN INTERFACE ALLOWING A USER TO PROVIDE INPUT ASSOCIATED WITH THE MODEL SELECTED DURING AN INTERACTIVE SESSION BETWEEN THE DIGITAL ENVIRONMENT AND A USER

216 ALLOW THE USER TO SPECIFY A SOURCE OF THE AT LEAST ONE MUSIC SEGMENT

OR

217 ALLOW THE USER TO PROVIDE AT LEAST ONE SAMPLE MUSIC SEGMENT USED TO MATCH THE MODEL

*FIG. 6*

218 SELECT THE AT LEAST ONE MUSIC SEGMENT TO PLAY WITHIN THE DIGITAL ENVIRONMENT, THE AT LEAST ONE MUSIC SEGMENT SELECTED BASED ON THE MODEL, THE LOCATION REQUIRING THE AT LEAST ONE MUSIC SEGMENT, AND THE DIGITAL ENVIRONMENT, SELECTING THE AT LEAST ONE MUSIC SEGMENT OPERABLE TO BE MODIFIED BASED ON THE MODEL, THE LOCATION REQUIRING THE AT LEAST ONE MUSIC SEGMENT, AND THE DIGITAL ENVIRONMENT

219 SELECT THE AT LEAST ONE MUSIC SEGMENT BASED ON A PERFORMANCE OF A USER AT THE LOCATION IN THE DIGITAL ENVIRONMENT

OR

220 ASSOCIATE AT LEAST ONE NEW MUSIC SEGMENT WITH THE MODEL

↓

221 SELECT THE AT LEAST ONE NEW MUSIC SEGMENT FROM THE MODEL

↓

222 REMOVE AN ASSOCIATION BETWEEN THE AT LEAST ONE MUSIC SEGMENT AND THE MODEL SUCH THAT THE AT LEAST ONE MUSIC SEGMENT IS NOT OPERABLE TO BE SELECTED

*FIG. 7*

223 SELECT THE AT LEAST ONE MUSIC SEGMENT TO PLAY WITHIN THE DIGITAL ENVIRONMENT, THE AT LEAST ONE MUSIC SEGMENT SELECTED BASED ON THE MODEL, THE LOCATION REQUIRING THE AT LEAST ONE MUSIC SEGMENT, AND THE DIGITAL ENVIRONMENT, SELECTING THE AT LEAST ONE MUSIC SEGMENT OPERABLE TO BE MODIFIED BASED ON THE MODEL, THE LOCATION REQUIRING THE AT LEAST ONE MUSIC SEGMENT, AND THE DIGITAL ENVIRONMENT

224 RECEIVE AN INCENTIVE TO SELECT THE AT LEAST ONE MUSIC SEGMENT OVER ANOTHER MUSIC SEGMENT WITHIN THE MODEL

↓

225 SELECT THE AT LEAST ONE MUSIC SEGMENT

OR

226 VERIFY THE AT LEAST ONE MUSIC SEGMENT HAS NOT PREVIOUSLY BEEN SELECTED DURING AN INTERACTION BETWEEN THE DIGITAL ENVIRONMENT AND A USER

*FIG. 8*

METHODS AND APPARATUS FOR ACOUSTIC MODEL BASED SOUNDTRACKS

BACKGROUND

Conventional computerized devices provide users with digital environments such as entertainment environments, games, educational software, simulation software, etc. Users (i.e., players of the game) can participate in the digital environments through the use of computerized devices (i.e., personal computers, cell phones, hand held computing devices, etc.). These computerized devices also allow users to participate in the digital environment online (i.e., connecting to a digital environment via the Internet). Connecting to an online digital environment allows users to participate along with other users who are also connected to the digital environment, via the Internet.

Digital environments may provide music to enhance the digital environment experience. Music can set the mood of the digital environment. For example, a user participating in a digital environment, such as a war game, may hear suspenseful music during a battle scene. Upon winning against an opponent within the battle scene, the user may hear victorious music, etc. A student interacting with an educational software program may hear upbeat music when the student answers a question correctly, and a different, less upbeat music when the student answers a question incorrectly.

Digital environments, such as games, are created by digital environment designers who generate the sequence of the games, and provide the music for each part of the game. Thus, a digital environment designer creates a battle scene, and chooses suspenseful music to be played during that scene (i.e., when a user, such as a player of the game, is interacting with the game). Depending on whether a user (i.e., a player of the game) is victorious or defeated during the battle scene, the digital environment designer will create the battle scene such that victorious music is played if the user (i.e., a player of the game) wins the battle scene, and music associated with a defeat is played if the user (i.e., a player of the game) loses. The music segments are associated with different segments of the game such that those music segments always play during the time a user (i.e., a player of the game) is interacting with those segments of the game (i.e., the digital environment).

SUMMARY

Conventional technologies for supplying music to digital environments suffer from a variety of deficiencies. In particular, conventional technologies for supplying music to digital environments are limited in that the music, or music segments, that are provided with digital environments, are permanently associated with particular locations of the digital environment. In other words, a user (i.e., a player of the game) interacting with the digital environment today hears the same music segments at a particular location of the digital environment that another user (i.e., a player of the game) heard when that other user (i.e., a player of the game) interacted with the digital environment several months ago. Since some users (i.e., players of the game) participate in the digital environment over the course of several months or even years, hearing the same music segments at a particular location of the digital environment, can become tedious. For users (i.e., players of the game) who interact with the digital environment over the course of several years, the music segments associated with a particular location can become outdated, giving the digital environment an outdated reputation. This may cause other users (i.e., players of the game) to avoid interacting with that digital environment, thus losing revenue for the manufacture of the digital environment. The content of the digital environment may still be current, but the outdated music affects the overall perception of the digital environment by the players of that game.

Embodiments disclosed herein provide a system that includes a computer system executing an acoustical model supplying process that utilizes a model to provide music segments to the digital environment, at different locations within the digital environment.

During an example operation of one embodiment, suppose a user (i.e., a designer of the digital environment) creates an online game. The user (i.e., a designer of the digital environment) provides several music segments associated with several recent horror films. The acoustical model supplying process identifies similarities between those music segments, and creates a model including additional music segments that have the same similarities as the music segments associated with the horror films. The user (i.e., a designer of the digital environment) associates the model with suspenseful locations within the online game.

A user (i.e., a player of the digital environment) plays with the game, and when the user (i.e., a player of the digital environment) reaches those locations in the game, the acoustical model supplying process selects a music segment from the model and the user (i.e., a player of the digital environment) hears suspenseful music played. Each time the user (i.e., a player of the digital environment) interacts with the game, such as an online game, at that location, a different music segment of suspenseful music is played. The user (i.e., a player of the digital environment) continues to play the online game, on an ongoing basis, over the course of two years.

The user (i.e., a designer of the digital environment) updates the model by providing music segments that are from more recent horror films (i.e., within the two years time span that the user, i.e., the player, has been playing the online game). Thus, when the user (i.e., a player of the digital environment) interacts with the online game, at that location, the user (i.e., a player of the digital environment) hears music segments from the most recent horror films.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include an acoustical model supplying process that utilizes a model to provide music segments to the digital environment, at different locations within the digital environment. In an example embodiment, the acoustical model consists of a set of characteristics or attributes that define a type of music. The set of characteristics are chosen by analyzing a "training" set of music segments. Once the acoustical model is defined, it is then used to find music that is similar to the acoustical model. As new music segments are provided to the digital environment, the acoustical model supplying process evaluates those music segments against each defined acoustical model to determine if those music segments are similar enough (i.e., within a certain threshold) to that acoustical model as to be considered a match. When it is appropriate to play the music segment within the digital environment, the acoustical model supplying process chooses from a selection of music segment that match the model.

The model provides a plurality of music segments that can be selected, for a particular location in the digital environment, at the time the user (i.e., a player of the game) is interacting with the digital environment. In other words, the music segment the user (i.e., a player of the game) hears while interacting with the digital environment (i.e., playing the game) is always fresh and up to date, even if the user (i.e., a player of the game) has been interacting with the digital environment for a number of years. In an example embodiment, a user (i.e., a designer of the digital environment) provides at least one music segment on which the model is created. The user (i.e., a designer of the digital environment) can provide, for example, music segments of a particular genre (i.e., rhythm and blues, jazz, etc.), music segments from a particular composer, music segments performed by a particular musical group, etc. The acoustical model supplying process compares the music segments, provided by the user (i.e., a designer of the digital environment), to identify similarities between the music segments, and creates the model based on those similarities. The acoustical model supplying process identifies locations within the digital environment where a music segment is required, and identifies at least one attribute associated with that location. For example, the acoustical model supplying process identifies a question and answer section within an educational software program and identifies that happy music is required when a user (i.e., a player of the digital environment) provides a correct answer to a question. Thus, a model associated with happy music is associated with this location within the digital environment, such that, when a use (i.e., a player of the digital environment) is interacting with the digital environment at that location, the acoustical model supplying process selects a music segment from the model (i.e., the model comprising music segments related to 'happy music'). In other words, when the user (i.e., a player of the digital environment) provides a correct answer to a question, the acoustical model supplying process selects happy music to play, alerting the user (i.e., a player of the digital environment) that a correct answer was provided. Each time the user (i.e., a player of the digital environment) answers a correct question, a different happy music segment may be played so that the user (i.e., a player of the digital environment) does not become bored with hearing the same music segment played each time a question (or even the same question) is answered correctly. In an example embodiment, location can also include impending trouble, such as a monster is lurking around the corner. Location can also include spatial aspects, such as the user (i.e., the player) is in a forest. Location can also include temporal aspects, such as a time of day, or that there are only thirty seconds left in the game, etc.

In an example embodiment, a user (i.e., a player of the digital environment) can select the source of the music that is selected by the model to be used while the user (i.e., a player of the digital environment) is interacting with the digital environment. In other words, as the user (i.e., a player of the digital environment) is, for example, playing an online game, the user (i.e., a player of the digital environment) can determine which music segments are used to match the model that provides the music segments to be played while the user (i.e., a player of the digital environment) is playing the game. The music segments may comprise music segments associated with the user's (i.e., a player of the digital environment) favorite musical groups, or a specific sub set of music that the user (i.e., a player of the digital environment) maintains for use in the digital environment. In this scenario, the model would contain music segments that match music from the user's (i.e., a player of the digital environment) private collection of music. As the user (i.e., a player of the digital environment) plays the game, the acoustical model supplying process would select music segments that match the model from the user's (i.e., a player of the digital environment) private collection to play at those locations within the game that require music segments.

A user (i.e., a designer of the digital environment) can modify which music segments are chosen by the model such that as a user (i.e., a player of the digital environment) interacts with the digital environment, updated music segments are played. In other words, the acoustical model supplying process can discover new music segments that match the model, selecting those new music segments from a plurality of music segments provided by a user. The acoustical model supplying process can select a music segment such that all music segments are selected once before any music segment is selected a second time.

In an example embodiment, the acoustical model supplying process receives an incentive to select one music segment over another music segment within the model. For example, a record label pays a digital environment manufacturer to give priority to music segments over music segments of other record labels. Thus, during the selecting of the music segment from the model, the acoustical model supplying process gives priority to selecting those music segments, within the model, that are associated with the record label.

The acoustical model supplying process provides a model (supplying music for the digital environment) for use within the digital environment. The model comprises at least one music segment. The acoustical model supplying process identifies a location (requiring the at least one music segment supplied by the model) within the digital environment, and selects at least one music segment to play within the digital environment. The selection of the music segment is based on the model, the location requiring the at least one music segment, and the digital environment. The selection of the music segment can be modified based on the model, the location requiring the at least one music segment, and the digital environment.

Figure 1:
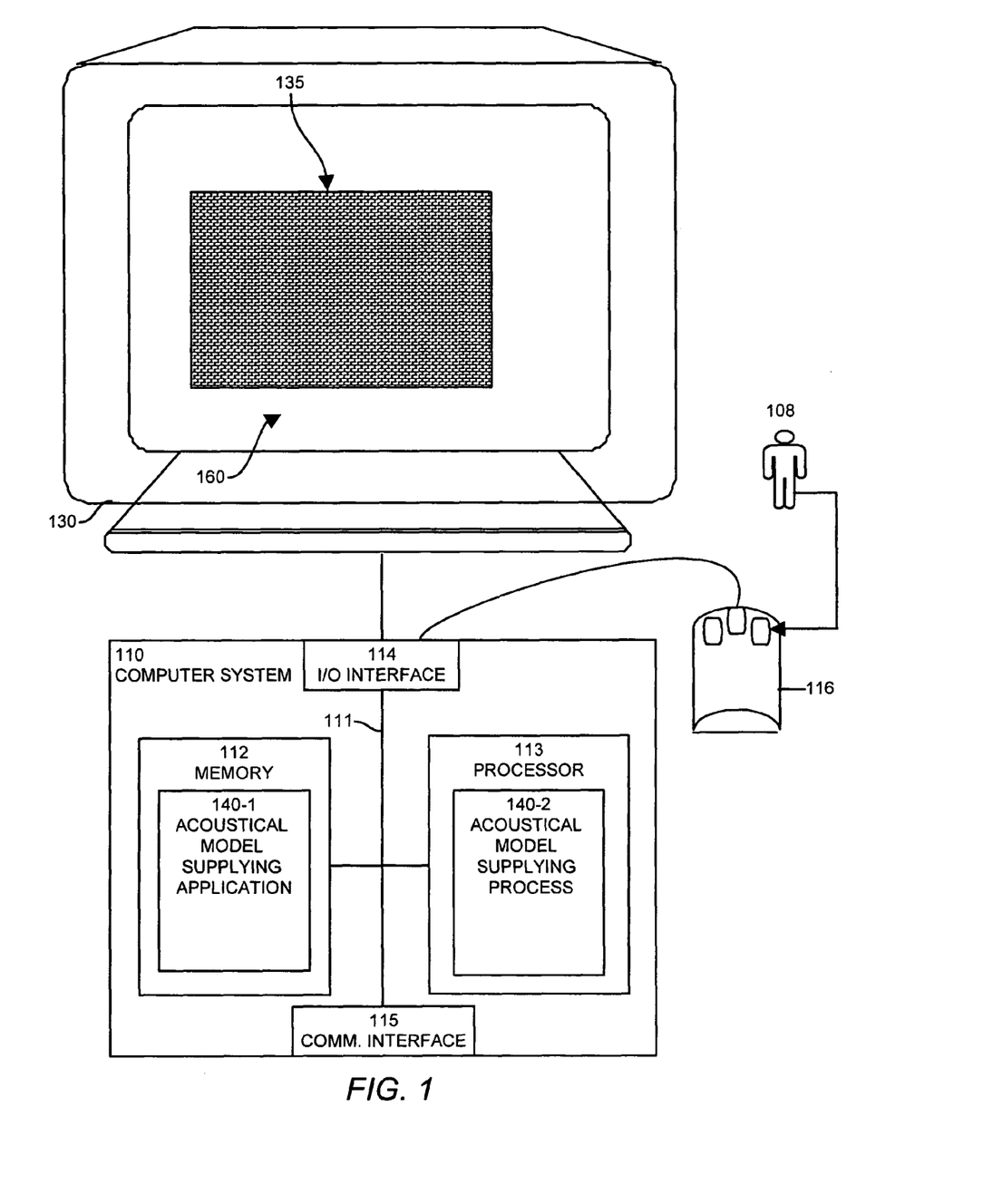
FIG. 1 shows a high level view according to one embodiment disclosed herein.

FIG. 1 is a block diagram illustrating example architecture of a computer system 110 that executes, runs, interprets, operates or otherwise performs an acoustical model supplying application 140-1 and process 140-2. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a pointing device, keyboard, mouse, etc.) couples to processor 113 through I/O interface 114, and enables a user 108 to provide input commands and generally control the graphical user interface 160 that the acoustical model supplying application 140-1 and process 140-2 provides on the display 130. The graphical user interface 160 displays a digital environment 135. The communications interface 115 enables the computer system 110 to communicate with other devices (i.e., other computers) on a network (not shown). This can allow access to the acoustical model supplying application by remote computer systems and in some embodiments, the digital environment 135 from a remote source via the communications interface 115.

The memory system 112 is any type of computer readable medium and in this example is encoded with an acoustical model supplying application 140-1. The acoustical model supplying application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the acoustical model supplying application 140-1. Execution of acoustical model supplying application 140-1 in this manner produces processing functionality in an acoustical model supplying process 140-2. In other words, the acoustical model supplying process 140-2 represents one or more portions of runtime instances of the acoustical model supplying application 140-1 (or the entire application 140-1) performing or executing within or upon the processor 113 in the computerized device 110 at runtime.

Figure 2:
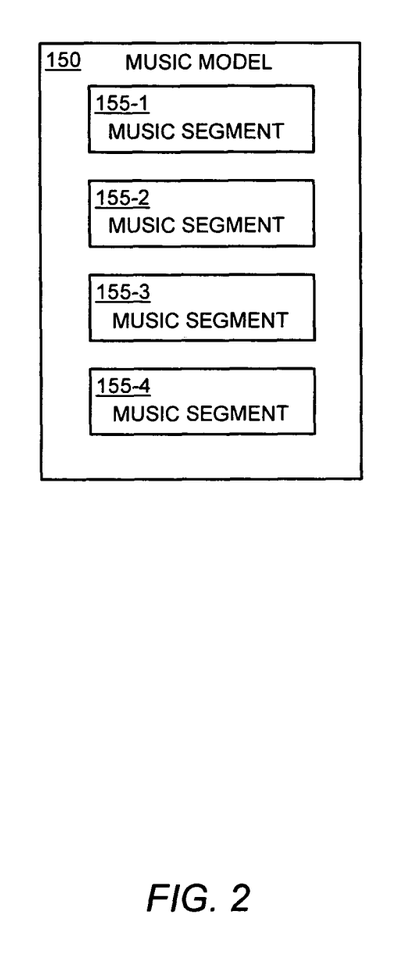
FIG. 2 illustrates an example embodiment of a model containing a plurality of music segments.

FIG. 2 is an example embodiment of a model 150 containing a plurality of music segments 155-N, as disclosed herein. A user 108, such as a designer of the digital environment 135, can modify the model 150 by adding and/or removing music segments 155-N within the model 150.

Further details of configurations explained herein will now be provided with respect to a flow chart of processing steps that show the high level operations disclosed herein to perform the content formatting process.

Figure 3:
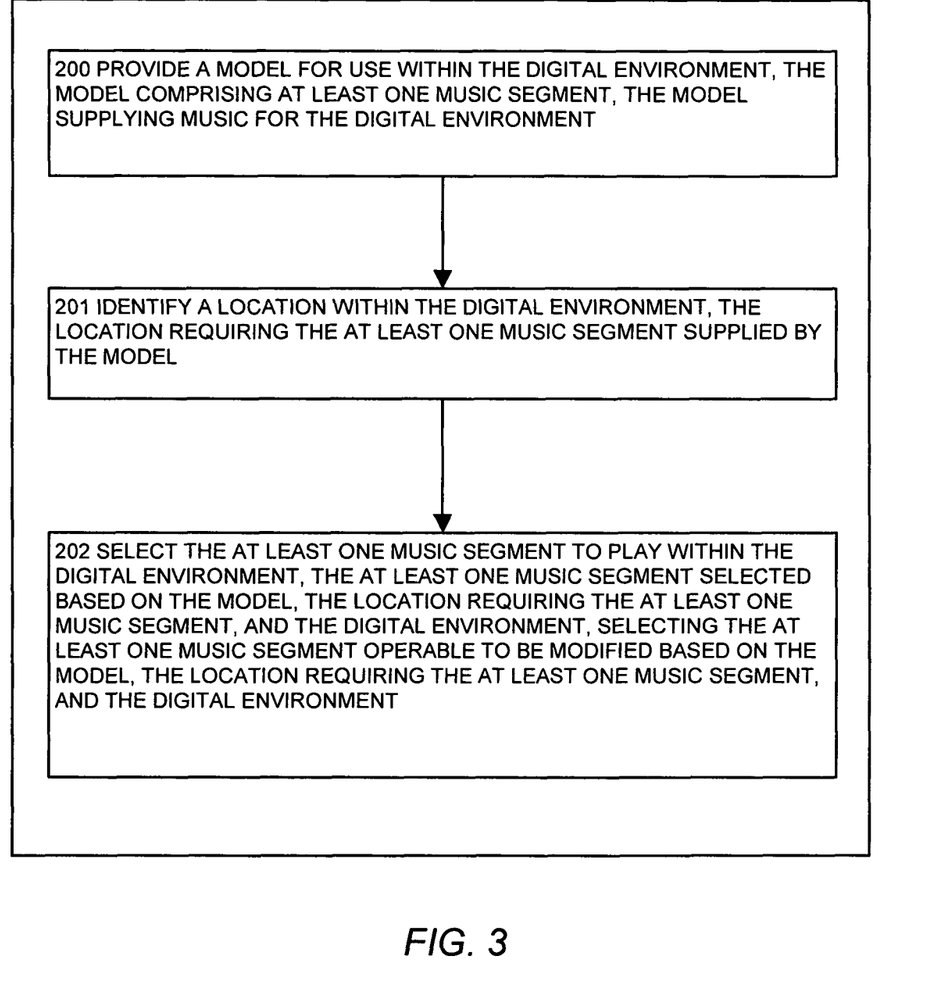
FIG. 3 illustrates a flowchart of a procedure performed by the system of FIG. 1, when the acoustical model supplying process provides a model for use within the digital environment, the model comprising at least one music segment, the model supplying music for the digital environment, according to one embodiment disclosed herein.

FIG. 3 is an embodiment of the steps performed by the acoustical model supplying process 140-2 when it provides a model 150 for use within the digital environment 135.

In step 200, the acoustical model supplying process 140-2 provides a model 150 for use within the digital environment 135. The model 150 comprises at least one music segment 155-1, and supplies music for the digital environment 135. The model 150 is an acoustical model that contains a plurality of music segments 155-N. The music segments 155-N may be of all one genre, such as jazz, rock, etc. The music segments 155-N may also be associated with a particular composer, or band, or even music segments 155-N that sound similar to music by a particular composer. The music segments 155-N may also relate to an emotion that those music segments 155-N provide to the digital environment 135, such as suspenseful music, happy music, threatening music, etc. In an example embodiment, music segments 155-N are chosen for the model 150, for example, "fast songs with a lot of electric guitar" or "quiet slow songs with many woodwinds".

In step 201, the acoustical model supplying process 140-2 identifies a location, within the digital environment 135, that requires at least one music segment 155-1 supplied by the model 150. Within the digital environment 135, such as an online game, music enhances the online game experience for a user 108 (i.e., a player of digital environment 135, etc.). Different locations within the online game require different music segments 155-N. In an example embodiment, a user 108 (i.e., a designer of digital environment 135, etc.), when creating the online game, identifies a location within the online game that requires music, such as music that indicates impending danger. The user 108 (i.e., a designer of digital environment 135, etc.) determines a model 150 that provides music segments 155-N that are associated with impending danger, and associates that model 150 with that location within the online game (i.e., the digital environment 135). Thus, when a user 108 (i.e., a player of digital environment 135, etc.) is interacting with the online game (i.e., the digital environment 135), the acoustical model supplying process 140-2 identifies the location within the online game that requires the music (i.e., the music indicating impending danger) supplied by the model 150. In an example embodiment, a user (i.e. a designer of digital environment 135, etc.) associates the model 150 with locations within the digital environment 135, such as "in the forest". Thus, whenever a user 108 (i.e., a player of the digital environment 135) is "in the forest", the acoustical model supplying process 140-2 selects music segments 135-N that match "quiet slow songs with many woodwinds". These descriptions are used to convey mood or emotion.

In step 202, the acoustical model supplying process 140-2 selects at least one music segment 155-1 to play within the digital environment 135. The music segment 155-1 is selected based on the model 150, the location requiring the at least one music segment 155-1, and the digital environment 135. For example, a digital environment 135, such as a war game, may have battle scenes. The music segment 155-1 chosen for that battle scene is based on the model 150 associated with that location (i.e., the battle scene) within the war game. The model 150 associated with that location might contain music segments 155-N that are dramatic and forceful, adding drama to the battle scene, thus enhancing the game experience for the user 108 (i.e., a player of digital environment 135, etc.). The acoustical model supplying process 140-2 may select a different music segment 155-2 for that location (i.e., the battle scene) within the war game (i.e., digital environment 135) each time a user 108 (i.e., a player of digital environment 135, etc.) is interacting with the war game at that location so that the user 108 (i.e., a player of digital environment 135, etc.) experiences a different interaction.

Figure 4:
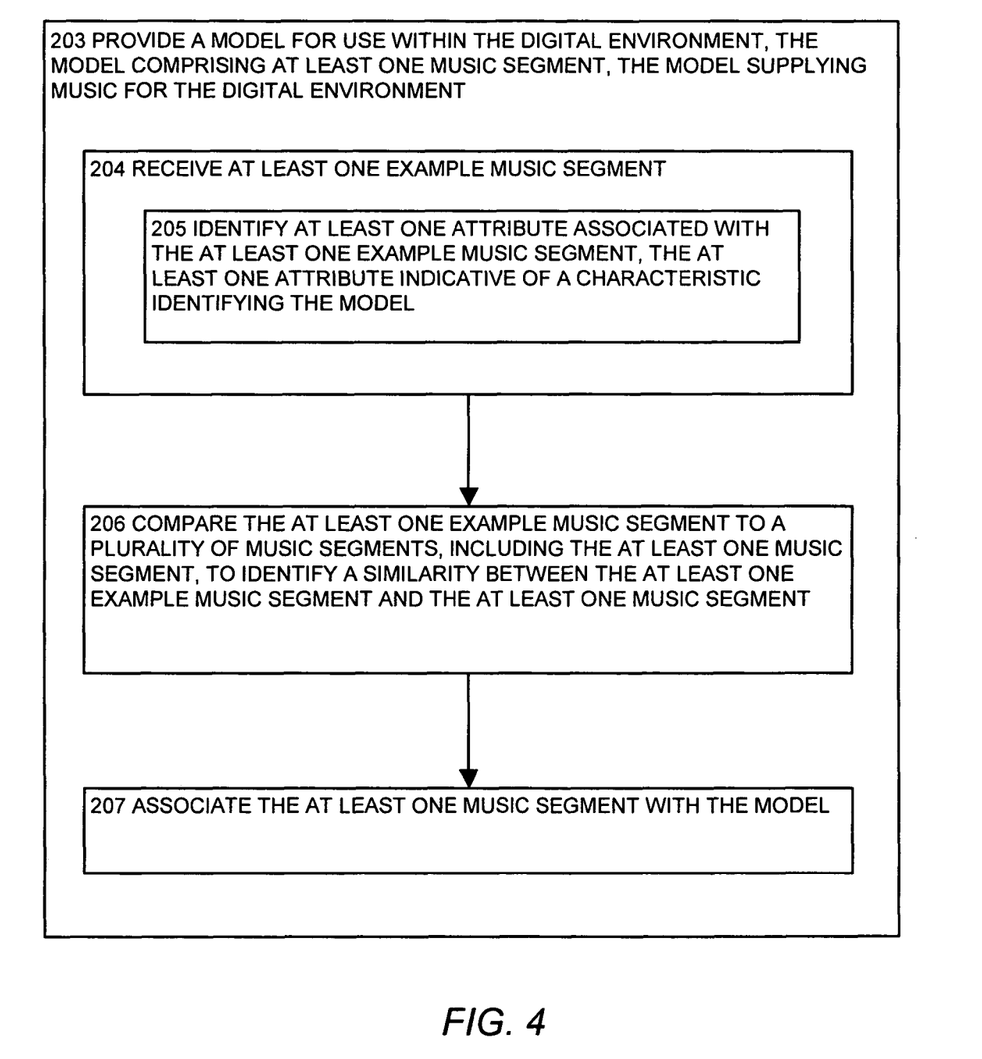
FIG. 4 illustrates a flowchart of a procedure performed by the system of FIG. 1, when the acoustical model supplying process provides a model for use within the digital environment, and receives at least one example music segment, according to one embodiment disclosed herein.

FIG. 4 is an embodiment of the steps performed by the acoustical model supplying process 140-2 when it provides a model 150 for use within the digital environment 135.

In step 203, the acoustical model supplying process 140-2 provides a model 150 for use within the digital environment 135. The model 150 comprises at least one music segment 155-1, and supplies music for the digital environment 135. The model 150 provides a plurality of music segments 155-N that can be played in the digital environment 135 during an interactive session with a user 108 (i.e., a player of digital environment 135, etc.). The model 150 can provide a different music segment 155-2 at a particular location within the digital environment 135 each time a user 108 (i.e., a player of digital environment 135, etc.) interacts with the digital environment 135.

In step 204, the acoustical model supplying process 140-2 receives at least one example music segment 155-3. In an example embodiment, the acoustical model supplying process 140-2 creates the model 150. The acoustical model supplying process 140-2 receives an example music segment 155-3 as a sample by which to create the model 150. In essence, the model 150 is created to provide music segments 155-N that are similar to the example music segment 155-3 provided by, for example, a designer of the digital environment 135 or a player of the digital environment 135.

In step 205, the acoustical model supplying process 140-2 identifies at least one attribute associated with the example music segment 155-3. The attribute is indicative of a characteristic identifying the model 150. The attribute may be the composer who wrote the music segment 155-3, the band that recorded the music segment 155-3, a genre in which the music segment 155-3 belongs, a movie for which the music segment 155-3 was one of several sound tracks, etc. In an example embodiment, the attribute might be related to acoustical spectrum, energy, beats per minute, instrumentation, etc.

In step 206, the acoustical model supplying process 140-2 compares the example music segment 155-3 to a plurality of music segments 155-N (including those music segments 155-N that are ultimately chosen to comprise the model 150) to identify a similarity between the example music segment 155-3 and the music segments 155-N (ultimately chosen to comprise the model 150).

In step 207, the acoustical model supplying process 140-2 associates the music segment 155-3 with the model 150. The acoustical model supplying process 140-2 compares the example music segment 155-3 with other music segments 155-N to determine which of the music segments 155-N match the model 150, and then associates those music segments 155-N with the model 150 such that at least one of those music segments 155-N is played during an interactive session of the digital environment 135.

Figure 5:
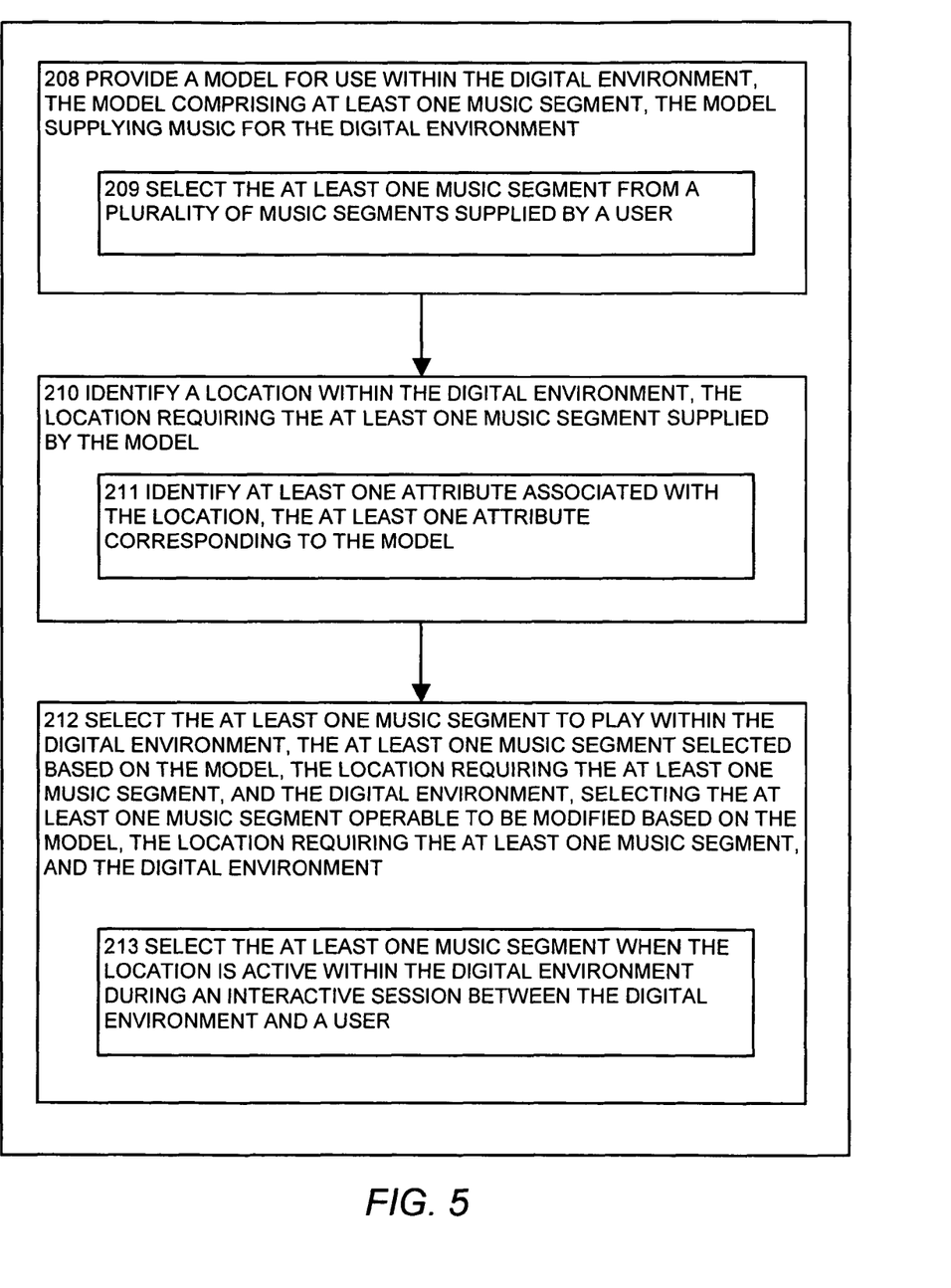
FIG. 5 illustrates a flowchart of a procedure performed by the system of FIG. 1, when the acoustical model supplying process provides a model for use within the digital environment, and selects at least one music segment from a plurality from a plurality of music segments supplied by a user, according to one embodiment disclosed herein.

FIG. 5 is an embodiment of the steps performed by the acoustical model supplying process 140-2 when it provides a model 150 for use within the digital environment 135.

In step 208, the acoustical model supplying process 140-2 provides a model 150 for use within the digital environment 135. The model 150 comprises at least one music segment 155-1, and supplies music for the digital environment 135. The music segments 155-N in the model 150 may be provided by a user 108 designing the digital environment 135, or a user 108 interacting with the digital environment 135, for example as a player playing an online game (i.e., the digital environment 135).

In step 209, the acoustical model supplying process 140-2 selects the music segment 155-1 from a plurality of music segments 155-N supplied by a user 108 (i.e., a player of digital environment 135, etc.). For example, a user 108 (i.e., a player of digital environment 135, etc.) may have a personal collection of music that the user 108 (i.e., a player of digital environment 135, etc.) may want to hear while interacting with the digital environment 135 (i.e., playing an online game, etc.). While the user 108 (i.e., a player of digital environment 135, etc.) is playing the online game, the acoustical model supplying process 140-2 selects the music segments 155-N from the user's 108 (i.e., a player of digital environment 135, etc.) personal collection of music. Thus, the acoustical model supplying process 140-2 creates the model 150 using music segments 155-N from the user's 108 (i.e., a player of digital environment 135, etc.) personal collection of music, and then selects those music segments 155-N to be played at various locations within the digital environment 135 (i.e., the online game) wherever those music segments 155-N are appropriate within the digital environment 135 (i.e., the online game).

In step 210, the acoustical model supplying process 140-2 identifies a location, within the digital environment 135, that requires the music segment 155-1 supplied by the model 150. During the creation of the digital environment 135, a user 108 (i.e., a designer of digital environment 135, etc.) may determines that certain locations of the digital environment 135 require music sound effects to enhance the experience of the digital environment 135. The user 108 (i.e., a designer of digital environment 135, etc.) may associate a model 150 with each of those locations. When a user 108 (i.e., a player of digital environment 135, etc.) is interacting with the digital environment 135, at one of those locations, the acoustical model supplying process 140-2 identifies that location as a location requiring a music segment 155-1 provided by the model 150 (that was associated with that location by the designer creating the digital environment 135).

In step 211, the acoustical model supplying process 140-2 identifies at least one attribute, associated with the location that corresponds to the model 150. For example, a location within the digital environment 135 may require suspenseful music or dramatic music. The acoustical model supplying process 140-2 identifies that attribute (i.e., that the location require suspenseful music or dramatic music), and determines that the attribute corresponds to the model 150 that provides music segments 155-N matching suspenseful or dramatic scenes within the digital environment 135.

In step 212, the acoustical model supplying process 140-2 selects at least one music segment 155-1 to play within the digital environment 135. The music segment 155-1 is selected based on the model 150, the location requiring the at least one music segment 155-1, and the digital environment. The music segment 155-1 selected can change each time a user 108 (i.e., a player of digital environment 135, etc.) is interacting with the digital environment 135.

In step 213, the acoustical model supplying process 140-2 selects at least one music segment 155-1 when the location is active within the digital environment 135 during an interactive session between the digital environment 135 and a user 108 (i.e., a player of digital environment 135, etc.). In an example embodiment, the music segment 155-1 is chosen from the model 150 at the time a user 108 (i.e., a player of digital environment 135, etc.) is playing an online game (i.e., interacting with the digital environment 135). Thus, the user 108 (i.e., a player of digital environment 135, etc.) may experience a different music segment 155-1 each time the user 108 (i.e., a player of digital environment 135, etc.) plays the online game.

Figure 6:
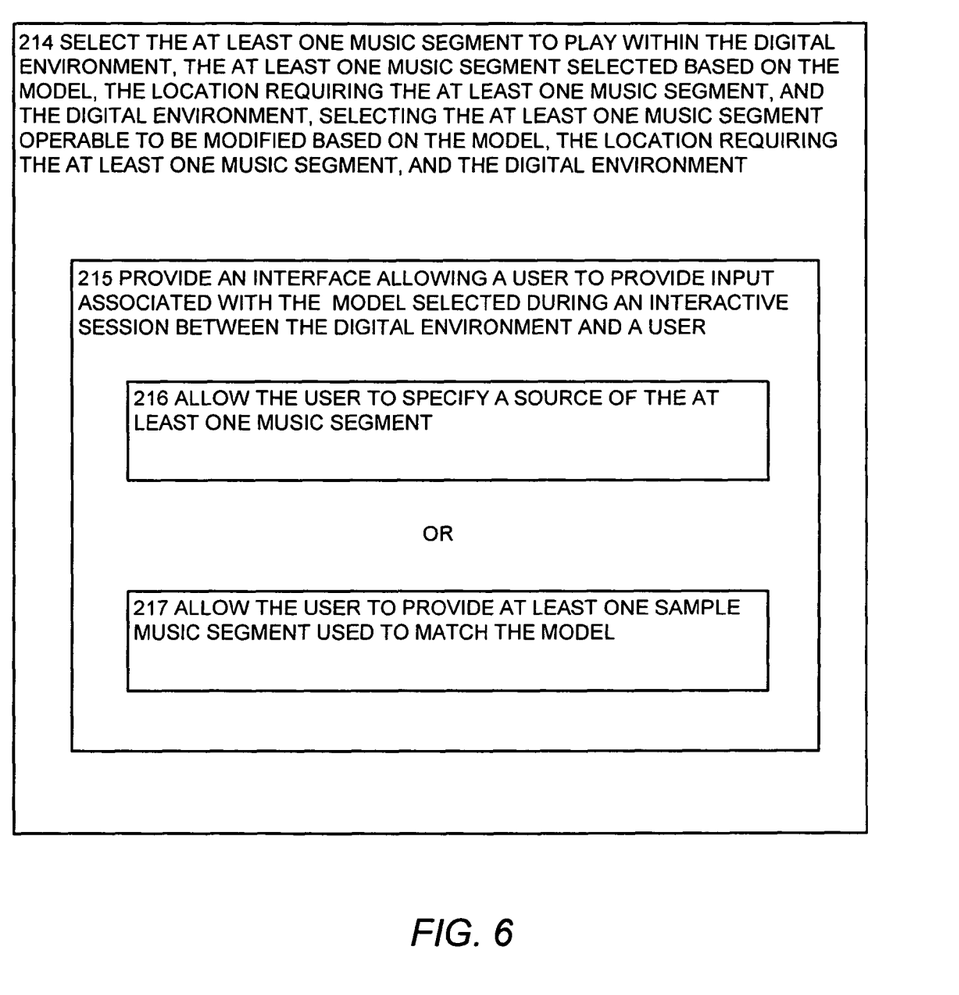
FIG. 6 illustrates a flowchart of a procedure performed by the system of FIG. 1, when the acoustical model supplying process selects at least one music segment to play within the digital environment, according to one embodiment disclosed herein.

FIG. 6 is an embodiment of the steps performed by the acoustical model supplying process 140-2 when it selects the music segment 155-1 to play within the digital environment 135.

In step 214, the acoustical model supplying process 140-2 selects at least one music segment 155-1 to play within the digital environment 135. The music segment 155-1 is selected based on the model 150, the location requiring the at least one music segment 155-1, and the digital environment 135. The music segment 155-1 selected can change each time a user 108 (i.e., a player of digital environment 135, etc.) is interacting with the digital environment 135.

In step 215, the acoustical model supplying process 140-2 provides an interface 160 allowing a user 108 to provide input associated with the model 150 selected during an interactive session between the digital environment 135 and a user 108. The acoustical model supplying process 140-2 provides an interface 160 that allows a user 108 (i.e., a player of digital environment 135, etc.) to provide input associated with the model 150. For example, the user 108 may select music segments 155-N to be used as the source of potentially matching music segments 155-N for the model 150 that is used during an interactive session between the digital environment 135 and a user 108 (i.e., a player of digital environment 135, etc.). The user 108 (i.e., a player of digital environment 135, etc.) may select the source of the music for the model 150 at the start of the online game, or may select a different music source at some point while playing the game (i.e., interacting with the digital environment 135).

In step 216, the acoustical model supplying process 140-2 allows the user 108 (i.e., a player of digital environment 135, etc.) to specify a source of the music segment 155-1. For example, the user 108 (i.e., a player of digital environment 135, etc.) may want to select a model 150 that contains music segments 155-N recorded by a particular music band, music segments 155-N of a particular genre, or even music that the user has downloaded to the user's 108 (i.e., a player of digital environment 135, etc.) computer, etc. In an example embodiment, the user 108 specifies a music segment 155-1 that exists, for example, on a website associated with that particular music band.

Alternatively, in step 217, the acoustical model supplying process 140-2 allows the user 108 (i.e., a player of digital environment 135, etc.) to provide at least one sample music segment 155-2 used to match the model. For example, the user 108 (i.e., a player of digital environment 135, etc.) provides a sample music segment 155-2 of the user's 108 (i.e., a player of digital environment 135, etc.) favorite song. The acoustical model supplying process 140-2 creates a model 150 of music segments 155-N that are similar to the sample music segment 155-2 provided by the user 108 (i.e., a player of digital environment 135, etc.). In other words, the user 108 (i.e., a player of digital environment 135, etc.) can determine the type of music segments 155-N played while interacting with the digital environment 135. Thus, when the user 108 (i.e., a player of digital environment 135, etc.) is interacting with the digital environment 135 (i.e., playing an online game, etc.), the user 108 (i.e., a player of digital environment 135, etc.) will hear music segments 155-N that are of the user's 108 (i.e., a player of digital environment 135, etc.) preference.

Figure 7:
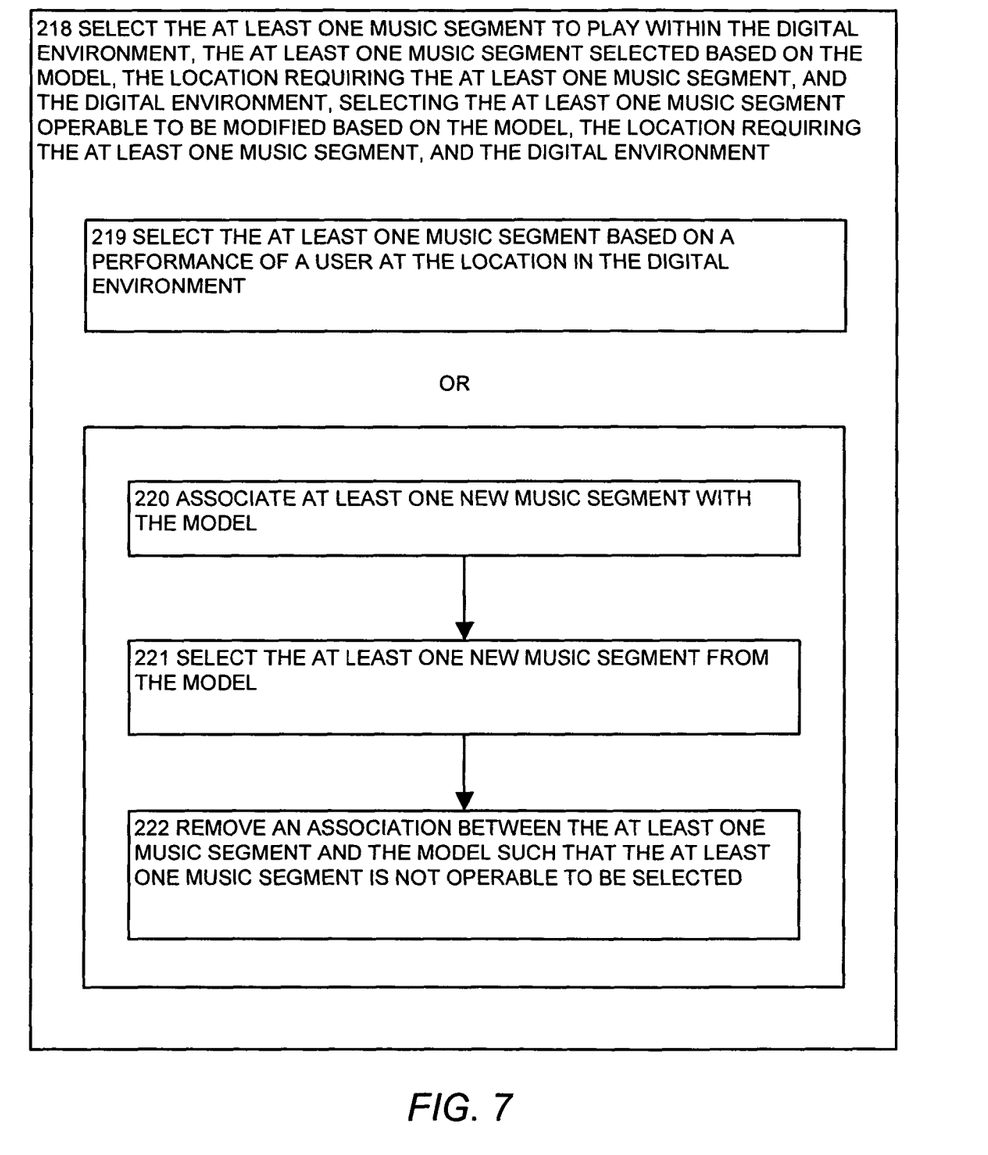
FIG. 7 illustrates a flowchart of a procedure performed by the system of FIG. 1, when the acoustical model supplying process selects at least one music segment to play within the digital environment, and selects the music segment based on a performance of a user, according to one embodiment disclosed herein.

FIG. 7 is an embodiment of the steps performed by the acoustical model supplying process 140-2 when it selects at least one music segment 155-1 to play within the digital environment 135.

In step 218, the acoustical model supplying process 140-2 selects at least one music segment 155-1 to play within the digital environment 135. The music segment 155-1 is selected based on the model 150, the location requiring the at least one music segment 155-1, and the digital environment 135. The music segment 155-1 that is selected may be different each time a user 108 (i.e., a player of digital environment 135, etc.) interacts with the digital environment 135.

In step 219, the acoustical model supplying process 140-2 selects the music segment 155-1 based on a performance of a user 108 (i.e., a player of digital environment 135, etc.) at the location in the digital environment 135. For example, as a user 108 (i.e., a player of digital environment 135, etc.) interacts with the digital environment 135 (i.e., plays an online game, etc.), the user 108 (i.e., a player of digital environment 135, etc.) may be playing against an opponent (i.e., a 'live' opponent, such as another user, not shown, playing the online game, or a fictitious opponent provided by the online game, etc.). The user 108 (i.e., a player of digital environment 135, etc.) may receive a score as the user 108 (i.e., a player of digital environment 135, etc.) advances through the online game. At a location requiring a music segment 155-1, the acoustical model supplying process 140-2 may select a music segment 155-1 from the model 150, based on how well the user 108 (i.e., a player of digital environment 135, etc.) is performing within the online game. Or, the acoustical model supplying process 140-2 may select a music segment 155-1 from a different model 150 based on the user's 108 (i.e., a player of digital environment 135, etc.) performance. For example, the acoustical model supplying process 140-2 may select a music segment 155-1 from a model 150 comprising 'victorious' music segments 155-N if the user 108 (i.e., a player of digital environment 135, etc.) is performing well, or the acoustical model supplying process 140-2 may select a music segment 155-1 from a model 150 comprising 'defeated' music segments 155-N if the user 108 (i.e., a player of digital environment 135, etc.) is not performing well within the online game (i.e., interacting with the digital environment 135).

Alternatively, in step 220, the acoustical model supplying process 140-2 associates at least one new music segment 155-1 with the model 150. The acoustical model supplying process 140-2 can update or modify the model 150 that provides music segments 155-N to the digital environment 135. In other words, the collection of music segments 155-N within the model 150 may be modified. In an example embodiment, new music segments 155-N are added to the model 150.

In step 221, the acoustical model supplying process 140-2 selects at least one new music segment 155-3 from the model 150. In an example embodiment, the model 150 is modified and new music segments 155-N are added to the model 150. During an interaction between the digital environment 135 and a user 108 (i.e., a player of digital environment 135, etc.), the acoustical model supplying process 140-2 selects a music segment 155-3, such as a new music segment, from the model 150. Thus, if a user 108 (i.e., a player of digital environment 135, etc.) is interacting with the digital environment 135 over a period of time, such as months or years, the user 108 (i.e., a player of digital environment 135, etc.) always hears fresh and updated music segments 155-N.

In step 222, the acoustical model supplying process 140-2 removes an association between the music segment 155-3 and the model 150 such that the music segment 155-3 is not operable to be selected. The acoustical model supplying process 140-2 can update the model 150 by removing music segments 155-N from the model 150. A music segment 155-3 that was popular last year may make the digital environment 135 sound dated this year. Thus the acoustical model supplying process 140-2 allows for removal of a music segment 155-3 from the model 150. Thus, when a user 108 (i.e., a player of digital environment 135, etc.) is interacting with the digital environment 135, that (removed) music segment 155-3 is no longer one of the music segments 155-N available to be selected. In an example embodiment, the acoustical model supplying process 140-2 removes an association between the music segment 155-3 and the model 150 for a first user 108 (i.e., a player of digital environment 135, etc.), but not for any other users 108, even though all users 108 (including the first user 108) have the same model 150 defined for their digital environment 135.

Figure 8:
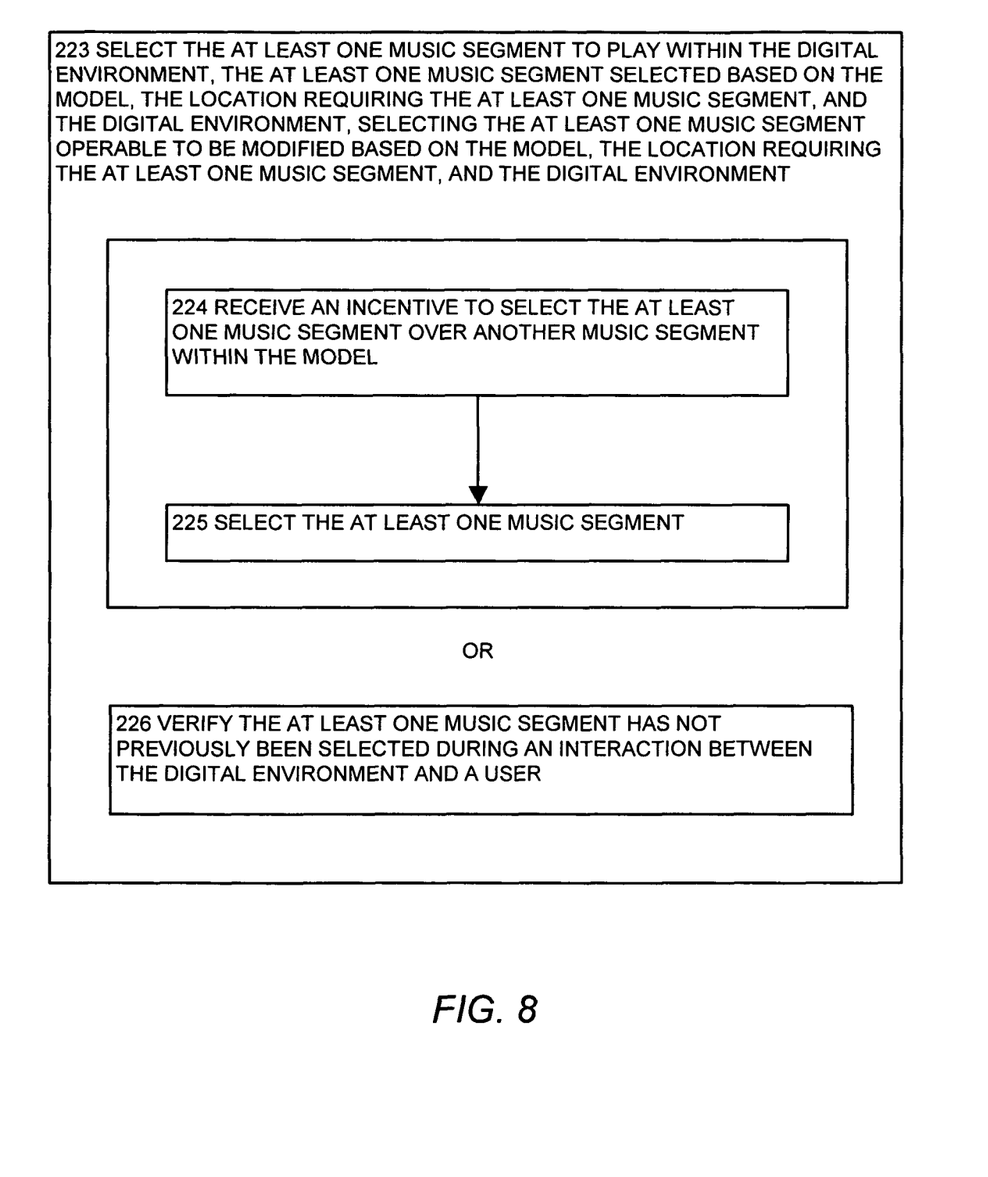
FIG. 8 illustrates a flowchart of a procedure performed by the system of FIG. 1, when the acoustical model supplying process select at least one music segment to play within the digital environment, and receives an incentive to select the music segment, according to one embodiment disclosed herein.

FIG. 8 is an embodiment of the steps performed by the acoustical model supplying process 140-2 when it selects at least one music segment 155-2 to play within the digital environment 135.

In step 223, the acoustical model supplying process 140-2 selects at least one music segment 155-2 to play within the digital environment 135. The music segment 155-2 is selected based on the model 150, the location requiring the at least one music segment 155-2, and the digital environment 135. The music segment 155-2 that is selected may be different each time a user 108 (i.e., a player of digital environment 135, etc.) interacts with the digital environment 135.

In step 224, the acoustical model supplying process 140-2 receives an incentive to select at least one music segment 155-2 over another music segment 155-4 within the model 150. The model 150 contains a plurality of music segments 155-N, any of which may be selected during an interactive session with a user 108 (i.e., a player of digital environment 135, etc.). The acoustical model supplying process 140-2 may receive an incentive (such as a payment), for example, from a music producer, so that the music segments 155-N (provided by the music producer) within the model 150 are more frequently selected during an interactive session with a user 108 (i.e., a player of digital environment 135, etc.). This is a venue by which a music producer can advertise music to the user 108 (i.e., a player of digital environment 135, etc.). In an example embodiment, while the user 108 (i.e., a player of digital environment 135, etc.) is interacting with the digital environment 135 (i.e., playing an online game, etc.), the user 108 (i.e., a player of digital environment 135, etc.) is notified of details associated with the music segment 155-2 being played, such as title, recording artist, etc. The user 108 (i.e., a player of digital environment 135, etc.) may also have the option to purchase that music segment 155-2 for download.

In step 225, the acoustical model supplying process 140-2 selects the music segment 155-2. Based on an incentive received to select the music segment 155-2 over another music segment 155-4, the acoustical model supplying process 140-2 selects the music segment 155-2 based on that incentive.

Alternatively, in step 226, the acoustical model supplying process 140-2 verifies the music segment 155-2 has not previously been selected during an interaction between the digital environment 135 and a user 108 (i.e., a player of digital environment 135, etc.). Prior to selecting the music segment 155-2 to be playing at a location during an interactive session between the digital environment 135 and a user 108 (i.e., a player of digital environment 135, etc.), the acoustical model supplying process 140-2 verifies that the music segment 155-2 has not previously been playing during an interactive session between the digital environment 135 and the user 108 (i.e., a player of digital environment 135, etc.). Thus, none of the music segments 155-N within the model 150 are repeated until the user 108 (i.e., a player of digital environment 135, etc.) has heard all the possible music segments 155-N provided by the model 150.

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Sun Microsystems, Inc. of Santa Clara, Calif.

What is claimed is:

1. A method of providing music within a digital environment, the method comprising:

providing a training set composed of a plurality of music segments;

providing an acoustic model associated with the music segments for use within the digital environment, the acoustic model analyzing the music segments in the training set, identifying similarities between the music segments in the training set, and identifying a set of attributes for the acoustic model;

identifying a location within the digital environment;

associating the acoustic model with the location;

providing a plurality of new music segments;

utilizing the acoustic model to evaluate the plurality of new music segments, and when a particular new music segment matches the set of attributes for the acoustic model, associating the particular new music segment with the acoustic model; and selecting, at the location within the digital environment, a music segment to play, the music segment being associated with the acoustic model that is associated with the location within the digital environment, thereby allowing the music segment that plays at the same location within the digital environment to be modified based on the acoustic model allowing the play of new music segments.

2. The method of claim 1 further comprising:
providing an interface allowing a user to provide input associated with the model selected during an interactive session between the digital environment and a user.

3. The method of claim 1 wherein the set of attributes includes an attribute indicative of a characteristic identifying the model.

4. The method of claim 1 wherein the plurality of new music segments are provided by a user.

5. The method of claim 1 further comprising:
identifying at least one attribute associated with the location, the at least one attribute corresponding to the acoustic model.

6. The method of claim 1 further comprising:
allowing a user to specify a source of the plurality of new music segments.

7. The method of claim 1 further comprising:
allowing a user to specify a source of the training set.

8. A computerized device comprising:
a memory;
a processor;
a communications interface;
an interconnection mechanism coupling the memory, the processor and the communications interface;
wherein the memory is encoded with an acoustical model supplying application that when executed on the processor is capable of supplying music segments on the computerized device by performing the operations of:
providing a training set composed of a plurality of music segments;
providing an acoustic model associated with the music segments for use within the digital environment, the acoustic model analyzing the music segments in the training set, identifying similarities between the music segments in the training set, and identifying a set of attributes for the acoustic model;
identifying a location within the digital environment;
associating the acoustic model with the location;
providing a plurality of new music segments;
utilizing the acoustic model to evaluate the plurality of new music segments, and when a particular new music segment matches the set of attributes for the acoustic model, associating the particular new music segment with the acoustic model; and
selecting, at the location within the digital environment, a music segment to play, the music segment being associated with the acoustic model that is associated with the location within the digital environment, thereby allowing the music segment that plays at the same location within the digital environment to be modified based on the acoustic model allowing the play of new music segments.

9. A computer readable non-transitory medium encoded with computer programming logic that when executed on a process in a computerized device supplies music segments, the medium comprising:
instructions, stored on the medium, for providing a training set composed of a plurality of music segments;
instructions, stored on the medium, for providing an acoustic model associated with the music segments for use within the digital environment, the acoustic model analyzing the music segments in the training set, identifying similarities between the music segments in the training set, and identifying a set of attributes for the acoustic model;
instructions, stored on the medium, for identifying a location within the digital environment;
instructions, stored on the medium, for associating the acoustic model with the location;
instructions, stored on the medium, for providing a plurality of new music segments;
instructions, stored on the medium, for utilizing the acoustic model to evaluate the plurality of new music segments, and when a particular new music segment matches the set of attributes for the acoustic model, associating the particular new music segment with the acoustic model; and
instructions, stored on the medium, for selecting, at the location within the digital environment, a music segment to play, the music segment being associated with the acoustic model that is associated with the location within the digital environment, thereby allowing the music segment that plays at the same location within the digital environment to be modified based on the acoustic model allowing the play of new music segments.

* * * * *